United States Patent [19]

Isberg et al.

[11] Patent Number: 6,057,067
[45] Date of Patent: May 2, 2000

[54] METHOD FOR PREPARING INTEGRAL BLACK MATRIX/COLOR FILTER ELEMENTS

[75] Inventors: Thomas A. Isberg, Apple Valley; Hsin-hsin Chou; Terrance P. Smith, both of Woodbury; William V. Dower, St. Paul; Martin B. Wolk, Woodbury, all of Minn.

[73] Assignee: 3M Innovative Properties Company, St. Paul, Minn.

[21] Appl. No.: 08/273,419

[22] Filed: Jul. 11, 1994

[51] Int. Cl.⁷ .......................................................... G03F 9/00
[52] U.S. Cl. .................................. 430/7; 430/200; 430/945
[58] Field of Search ............................. 430/20, 945, 200, 430/7

[56] References Cited

U.S. PATENT DOCUMENTS

| | | |
|---|---|---|
| 3,787,210 | 1/1974 | Roberts . |
| 4,923,860 | 5/1990 | Simons ..................................... 503/227 |
| 4,962,081 | 10/1990 | Harrison et al. ........................ 503/227 |
| 4,965,242 | 10/1990 | DeBoer et al. ......................... 503/227 |
| 4,975,410 | 12/1990 | Weber et al. ............................ 503/227 |
| 5,073,534 | 12/1991 | Harrison et al. ........................ 503/227 |
| 5,089,372 | 2/1992 | Kirihata et al. ......................... 430/167 |
| 5,156,938 | 10/1992 | Foley et al. .............................. 430/200 |
| 5,166,126 | 11/1992 | Harrison et al. ........................ 503/227 |
| 5,171,650 | 12/1992 | Ellis et al. ................................. 430/20 |
| 5,256,506 | 10/1993 | Ellis et al. ................................. 430/20 |
| 5,278,023 | 1/1994 | Bills et al. ............................... 430/201 |
| 5,308,737 | 5/1994 | Bills et al. ............................... 430/201 |
| 5,326,619 | 7/1994 | Dower et al. ........................... 438/200 |

FOREIGN PATENT DOCUMENTS

| | | |
|---|---|---|
| 860118838 | 12/1987 | Japan . |
| 870262369 | 4/1989 | Japan . |
| 920269813 | 4/1994 | Japan . |

OTHER PUBLICATIONS

Color Filters from Dyed Polyimides by William J. Latham and Dan W. Hawley of Brewer Science, Inc., Rolla, Missouri, published in Solid State Technology in May, 1988.
Colour Filters for LCDs by K. Tsuda, published in Displays vol. 14, No. 2, in 1993.

*Primary Examiner*—Christopher G. Young
*Attorney, Agent, or Firm*—Robert J. Pechman

[57] ABSTRACT

A method for the manufacture of a matrix on a substrate, said matrix being particularly useful in the formation of color filter elements, the process comprising the steps of:

a) providing an imageable article comprising a substrate having on at least one surface thereof a black layer, b) directing energy of sufficient intensity at said black layer to transparentize black layer, c) said directing of energy being done so that black layer is removed in some areas, but is not removed in other areas so that borders of black layer surround areas from which black layer has been removed.

A preferred method deposits colorant material within the open areas of the matrix by thermal transfer, e.g., laser induced thermal transfer, of colorant material to form a filter element.

16 Claims, No Drawings

METHOD FOR PREPARING INTEGRAL BLACK MATRIX/COLOR FILTER ELEMENTS

BACKGROUND OF THE INVENTION

1. Field of the Invention

This invention relates to a method for preparing a black matrix with a color filter element for use as an element in color displays. In particular, this invention relates to a method for preparing a black matrix with a color filter element for use in liquid crystal display devices.

2. Background of the Art

One method of making colored images upon a non-photosensitive base uses laser induced colorant transfer or laser induced mask production. A donor element is induced (as by ablative levels of radiation) to transfer donor color material to a receptor surface. The donor may contain radiation or thermally sensitive materials to enhance the efficiency of transfer, or the donor material may be ablated without additional materials. Examples of this type of imaging process includes U.S. Pat. Nos. 5,156,938, 5,171,650, 5,256,506, and 5,089,372. The first three patents generally refer to producing a pattern of intelligence.

U.S. Pat. No. 5,171,650 discloses methods and materials for thermal imaging using an "ablation-transfer" technique. The donor element for that imaging process comprises a support, an intermediate dynamic release layer, and an ablative carrier topcoat. The topcoat carries the colorant. The dynamic release layer may also contain infrared-absorbing (light to heat conversion) dyes or pigments. The pigments also include black copper as an additive. Nitrocellulose is disclosed as a possible binder.

Copending U.S. application Ser. No. 07/855,799 discloses ablative imaging elements comprising a substrate coated on a portion thereof with an energy sensitive layer comprising a glycidyl azide polymer in combination with a radiation absorber. Demonstrated imaging sources included infrared, visible, and ultraviolet lasers. Solid state lasers were disclosed as exposure sources, although laser diodes were not specifically mentioned. This application is primarily concerned with the formation of relief printing plates and lithographic plates by ablation of the energy sensitive layer. No specific mention of utility for thermal mass transfer was made.

U.S. Pat. No. 5,308,737 discloses the use of black metal layers on polymeric substrates with gas-producing polymer layers which generate relatively high volumes of gas when irradiated. The black metal (e.g., aluminum) absorbs the radiation efficiently and converts it to heat for the gas-generating materials. It is observed in the examples that in some cases the black metal was eliminated from the substrate, leaving a positive image on the substrate.

U.S. Pat. No. 5,278,023 discloses laser-addressable thermal transfer materials for producing color proofs, printing plates, films, printed circuit boards, and other media. The materials contain a substrate coated thereon with a propellant layer wherein the propellant layer contains a material capable of producing nitrogen ($N_2$) gas at a temperature of preferably less than about 300 degree C.; a radiation absorber; and a thermal mass transfer material. The thermal mass transfer material may be incorporated into the propellant layer or in an additional layer coated onto the propellant layer. The radiation absorber may be employed in one of the above-disclosed layers or in a separate layer in order to achieve localized heating with an electromagnetic energy source, such as a laser. Upon laser induced heating, the transfer material is propelled to the receptor by the rapid expansion of gas. The thermal mass transfer material may contain, for example, pigments, toner particles, resins, metal particles, monomers, polymers, dyes, or combinations thereof. Also disclosed is a process for forming an image as well as an imaged article made thereby.

None of these patents teach the production of windows and the subsequent overlaying of these windows with colorants to form color filters.

A series of patents (U.S. Pat. Nos. 4,965,242, 4,962,081, 4,975,410, 4,923,860, 5,073,534, and 5,166,126) have been assigned to Kodak disclosing the use of thermal dye diffusion transfer to make filter elements and color filter constructions. U.S. Pat. Nos. 4,965,242 and 5,073,534 teach the use of high $T_g$ polycarbonate and polyester receiving layers to accept the thermally transferred dye. With both receiving layers, a vaporous solvent treatment is required to drive the dye into the receiving layer.

SUMMARY OF THE INVENTION

The present invention relates to a process of forming a black matrix with a color filter element within the matrix. The process may generally involve the following steps:

1) provide a light transmissive substrate having a thermally transparentize (e.g., any process which generates heat to remove materials, including photochemical processes in which irradiation causes chemical changes which effectively transparentize the coating) black coating thereon,
2) projecting radiation against said black coating to transparentize black coating on said substrate, said transparentization creating areas on said substrate which are more light transmissive than areas where black coating has not been transparentized, and
3) transferring one or more pigment layers onto at least some of said areas which are more light transmissive to create a black matrix/color filter element.

"thermally ablative transfer material" or "element" or "medium" refers to a medium which is ablated in thermal imaging processes by the action of a thermal source, by a rapid removal of material from the surface but without sublimation of the material;

"thermally melt stick materials" include thermal mass transfer materials which when thermally addressed stick to a receptor surface with greater strength than they adhere to the donor surface and physically transfer when the surfaces are separated. The above two processes may be used equivalently to other methods within the concept of laser induced mass transfer for generating colors.

"transparentize" or "transparentization" refers to a process in which a substantial increase in the light transmissivity of the medium is observed (e.g., through vaporization, oxidation, ablation, etc. of the black coating layer).

This invention allows for the creation of a black matrix/color filter element by forming a black matrix without using photoresist technology.

Registration of the windows with the color filter elements in the practice of the present invention is possible with a high degree of precision.

In one embodiment of our invention a pigment layer is directly transferred to a glass substrate, without a receiving layer, and no further treatment is required. Our invention has the distinct advantage of using pigments as colorants which are less prone to migration and are considerably more lightfast than dyes.

DETAILED DESCRIPTION OF THE INVENTION

The present invention relates to a process of forming a black matrix (e.g., a window) with a color filter element within the matrix. The process may be generally described as involving the following steps:
1) providing a light transmissive substrate having a thermally transparentizable black coating thereon,
2) projecting radiation against said black coating to transparentize black coating on said substrate, said transparentization creating areas on said substrate which are more light transmissive than areas where black coating has not been transparentized, and
3) transferring one or more colorant layers onto at least some of said areas which are more light transmissive to create a black matrix/color filter element.

The black matrix can be prepared from a variety of materials. A typical construction comprises a black or dark colored coating on a transparent substrate. The black matrix may optionally comprise additional layers such as primers or undercoats to improve adhesion of the black colored coating to the substrate and overcoats to tailor properties (e.g., receptivity, abrasion resistance, antireflection, etc.) as desired. Preferably the black coated substrate has an average optical density in the visible region (400–700 nm.) of greater than 1, more preferably greater than 2. The construction is addressed in an imagewise fashion to render some regions optically transparent.

In the case of some coatings, such as black metal coatings, one surface of the coating may be black, and the other surface may be black, shiny (reflective), or somewhere in between. In this case the black coating is preferably black on the surface that will be viewed by the observer in the final black matrix/color filter element. It is also generally preferable that the laser used to ablate or transparentize the black coating address the black or less reflective side of the black coating layer.

The black coating can be any material that provides the appearance of black and can be ablated or otherwise rendered optically transparent when imaged. The black coating is preferably any black body absorbing material. By black body absorbing material is meant any material that has significant absorptions in the UV, visible, and near infrared regions of the spectrum. Such materials often have increasing absorbance going from longer to shorter wavelength across the spectrum. Examples of black body absorbers include carbon black, a metal, a metal oxide, or combinations thereof. When the black coating layer comprises carbon black, it is preferred that the carbon black be dispersed in a film forming binder.

When the black body absorber is a black metal layer, particularly when it is a black metal oxide or sulfide layer, it preferably comprises black aluminum, black tin, or black chromium and may be produced by processes such as metal evaporation or metal sputtering according to the teachings of U.S. Pat. No. 4,430,366. Most preferably the black coating is a mixture of metal and metal oxide.

Other suitable black coatings include organic colorants (i.e. dyes and pigments) or mixtures of dyes and pigments. In the case of organic colorants, it is preferred that they be dispersed or dissolved in a binder. The binder may be any organic polymer. A preferred organic colorant/binder combination is carbon black/acrylic polymer.

The black coating layer must absorb a significant amount of the incoming radiation at the wavelength of irradiation. It is preferred that the coating be absorptive rather than reflective. Addition of a dye or other radiation absorber may be necessary with some coatings when using infrared lasers as the radiation source.

In one embodiment of this invention, the black matrix can be prepared by positioning a mask containing the desired window pattern on top of the black coated substrate, and then using a laser or other high powered light source (e.g., xenon flash lamp) to ablate or transparentize the unmasked portions. Masks may be prepared by conventional methods known in the art such as through the use of a photoresist/etching process. The mask is usually made of a material that reflects the incident laser radiation, and can be coated or deposited on a flexible or a rigid substrate. Materials commonly used to reflect the incident radiation include chrome and/or aluminum. When a laser is used to ablate or transparentize the black coated substrate, the laser may be scanned in a continuous fashion over the mask, which is held in intimate contact with the substrate. The use of a mask to prepare the black matrix in general results in sharp window edges and precise registration of the window edges. It is crucial that no debris from the imaging process contaminate the mask. One method of eliminating contamination resulting from the imaging process is to prelaminate a sacrificial layer to the black coated substrate. The sacrificial layer may be removed after imaging. An example of a sacrificial layer is a thin film of PET coated with a thermoplastic layer (e.g., waxes, synthetic polymers, and mixtures thereof) that can be laminated onto the black coated substrate. When the sacrificial layer is removed, the thermoplastic material has the property of removing any debris that is produced during imaging, and prohibits the contamination of the mask during the imaging process.

In still another embodiment of this invention, the black matrix can be directly prepared by electronically modulating the laser beam to ablate or transparentize the desired pattern.

Substantially any metal capable of forming an oxide or sulfide can be used in the practice of this invention for the black metal or metal oxide layer. In particular aluminum, tin, chromium, nickel, titanium, cobalt, zinc, iron, lead, manganese, copper and mixtures thereof can be used. Not all of these metals when converted to metal oxides according to this process will form materials having all of the specifically desirable properties (e.g., optical density, light transmissivity, etc.). However, all of these metal oxide containing layers formed according to the practice of the present invention will be useful and contain many of the benefits of the present process including bondability to polymeric materials. The metal vapors in the chamber may be supplied by any of the various known techniques suitable for the particular metals, e.g., electron beam vaporization, resistance heaters, etc. Reference is made to *Vacuum Deposition Of Thin Films*, L. Holland, 1970, Chapman and Hall, London, England with regard to the many available means of providing metal vapors and vapor coating techniques, in general.

Metal oxide or metal sulfide containing layers, exemplary of the black metal layers according to the present invention, may be deposited as thin as layers of molecular dimensions up through dimensions in micrometers. The composition of the layer throughout its thickness may be readily controlled as herein described. Preferably the metal/metal oxide or sulfide layer will be between 50 and 5000 Å in its imaging utilities, but may contribute bonding properties when 15 Å, 25 Å or smaller and structural properties when $5 \times 10^4$ Å or higher.

The conversion to graded metal oxide or metal sulfide is effected by the introduction of oxygen, sulfur, water vapor or hydrogen sulfide at points along the metal vapor stream. By thus introducing these gases or vapors at specific points along the vapor stream in the vapor deposition chamber, a coating of a continuous or graded composition (throughout either thickness of the layer) may be obtained. By selectively maintaining a gradation of the concentration of these reactive gases or vapors across the length of the vapor deposition chamber through which the substrate to be coated is being moved, an incremental gradation of the composition of the coating layer (throughout its thickness) is obtained because of the different compositions (i.e., different ratios of oxides or sulfides to metals) being deposited in different regions of the vapor deposition chamber. One can in fact deposit a layer comprising 100% metal at one surface (the top or bottom of the coating layer) and 100% metal oxide or sulfide at the other surface. This kind of construction is a particularly desirable one because it provides a strong coherent coating layer with excellent adhesion to the substrate.

A substrate which is to be coated continuously moves along the length of the chamber from an inlet area of the vapor deposition chamber to an outlet area. Metal vapor is deposited over a substantial length of the chamber, and the proportion of metal oxide or sulfide being codeposited with the metal at any point along the length of the chamber (or deposited as 100% oxide or sulfide) depends upon the amount of reactive gas or vapor which has entered that portion of the metal vapor stream which is being deposited at that point along the length of the chamber. Assuming, for purposes of illustration, that an equal number of metal atoms (as metal or oxides or sulfides) are being deposited at any time at any point along the length of the chamber, gradation in the deposited coating is expected by varying the amount of oxygen or sulfur containing reactive gas or vapor which contacts the metal vapor at various points or areas along the length of the chamber. By having a gradation of increasing amounts of reactive gas along the length of the chamber, one gets a corresponding gradation in the increased proportions of oxide or sulfide deposited. Deposition of metal vapor is seldom as uniform as that assumed, but in actual practice it is no more difficult according to the procedures of the present invention to locally vary the amount of oxygen, water, sulfur or hydrogen sulfide introduced into different regions of said metal vapor along the length of the surface of the substrate to be coated as the substrate is moved so as to coat the surface with a layer having varying ratios of metal/(metal oxide or sulfide) through its thickness. It is desirable that the reactive gas or vapor enter the stream itself and not just diffuse into the stream. The latter tends to cause a less controllable distribution of oxides within the stream. By injecting or focussing the entrance of the reactive gas or vapor into the stream itself, a more consistent mixing in that part of the stream is effected.

Transitional characteristics bear an important relationship to some of the properties of the black metal products. The coating has dispersed phases of materials therein, one the metal and the other the metal oxide or sulfide. The latter materials are often transparent or translucent, while the former are opaque. By controlling the amount of particulate metal which remains dispersed in the transparent oxide or sulfide phase, the optical properties of the coating can be dramatically varied. Translucent coatings of yellowish, tan, and gray tones may be provided, and substantially opaque black film may be provided from a single metal by varying the percentage of conversion of the metal to oxide during deposition of the coating layer.

The substrate may be any substance upon which a window, color filter or the like is desired to be formed. Preferably the substrate is a transparent (at least light transmissive) substrate, such as glass, polymer film, and the like. When glass is the substrate, the use of glass treated with silane coupling agents (e.g., 3-aminopropyltriethoxysilane) may be useful to increase adhesion of the colorant layer.

Possible substrates include glass, polyester base (e.g., polyethylene terephthalate, polyethylene naphthalate), polycarbonate resins, polyolefin resins, polyvinyl resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of 2 to 100 mils (e.g., 0.05 to 2.54 mm) is preferred. If the substrate is a polymeric film, it is preferred that the film be non-birefringent so as not to interfere with the operation of the display in which it is to be integrated. When polymeric films are chosen as the substrate, it is sometimes desirable to have an adhesive layer on the substrate to maximize the transfer of the colorant layer. Preferred examples of non-birefringent substrates are polyesters that are solvent cast. Typical examples of these are those derived from polymers consisting or consisting essentially of repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938. Another class of non-birefringent substrates are amorphous polyolefins (e.g., Zeonex™ from Nippon Zeon Co., Ltd.). The most preferred substrate is glass. It is preferred that this glass be 0.5 to 2.0 mm thick. Especially preferred thicknesses are 0.7 and 1.1 mm.

The colors to be deposited on the windows of the black matrix substrate sheet may comprise any color material which can be deposited within the windows with adherence to the substrate. In a preferred embodiment, the colorant is in a suitable binder system and is solvent coated.

When pigments are used as the color material, they are preferably transparent. Examples of transparent pigments that can be used in this invention include Sun RS Magenta 234-0077™, Hoechst GS Yellow GG11-1200™, Sun GS Cyan 249-0592™, Sun RS Cyan 248-0615™, Ciba-Geigy BS Magenta RT-333D™, Ciba-Geigy Microlith Yellow 3G-WA™, Ciba-Geigy Microlith Yellow 2R-WA™, Ciba-Geigy Microlith Blue YG-WA™, Ciba-Geigy Microlith Black C-WA™, Ciba-Geigy Microlith Violet RL-WA™, Ciba-Geigy Microlith Red RBS-WA™, any of the Heucotech Aquis II™ series, any of the Heucosperse Aquis III™ series, and the like.

A preferred method of inserting or depositing the colors on the matrix is by a laser induced mass transfer process in which a donor sheet having the colors thereon is used to transfer colors onto the substrate within the borders of the matrix lines. Such donor sheets are known in the art for direct image forming, but are not believed to have been shown for use in the formation of color filters.

An example of a suitable color donor element would be a coating of dye or pigment (with or without a binder) on a substrate. A laser or other focused radiation source is used to heat the color material in an imagewise manner to transfer the color to the matrix bearing receptor sheet. It is often desirable in such constructions to assist in the absorption intensity of the imaging radiation since the dye or pigment (and the substrate) may not necessarily be highly absorptive of the imaging radiation. An imaging radiation absorbent material may be included within the dye/pigment layer (e.g., where an infrared emitting imaging radiation source is used, an infrared absorbing dye with little or no visible absorbance may be used). A separate imaging radiation layer may also be used, normally adjacent to the color containing donor layer. The colors of the donor layer may be selected as needed by the user from amongst the many available colors normally or specially used in filter elements, such as cyan, yellow, magenta, red, blue, green, white and other colors and tones of the spectrum as contemplated. The dyes are preferably transmissive of preselected specific wavelengths when transferred to the matrix bearing receptor layer. For many applications, highly transmissive dyes, e.g., dyes having an optical density of less than 0.5 optical density units within a narrow wavelength distribution of 10 nanometers or less when those dyes are present on the matrix, are preferred. Dyes with even lower absorption characteristics within those narrow wavelength bands are more preferred.

A typical color donor element is comprised of a substrate layer, a light-to-heat-conversion layer (LTHC), a colorant layer, and optionally an adhesive layer. The substrate layer is typically a polyester film. However, any film that has sufficient transparency at the imaging wavelength and sufficient mechanical stability can be used. The LTHC layer can be a black body absorber, an organic pigment, or dye such that the LTHC layer has an optical density between 0.2–3.0. A preferred LTHC layer is a metal/metal oxide layer (e.g. black aluminum). The colorant layer is comprised of at least one organic or inorganic colorant or pigment and optionally an organic polymer or binder. The colorant layer may also contain a variety of additives including but not limited to dyes, plasticizers, UV-stabilizers, film forming additives, and adhesives. When a dye is used as an additive, it is generally preferable that the dye absorbs light of the same frequency as the imaging light source. The optional adhesive layer may also contain a dye that absorbs light of the same frequency as the imaging laser or light source.

In a preferred embodiment, the colorant layer refers to a layer containing a pigment, surfactant, binder, and possibly other additives. Any pigment may be used, but preferred are those listed as having good color permanency and transparency in the NPIRI Raw Materials Data Handbook, Volume 4 (Pigments). Either non-aqueous or aqueous dispersions of pigment in binder may be used. In the non-aqueous case, solvent based pigment dispersions may be used along with an appropriate solvent based binder (i.e. Elvacite™ acrylic resins available from DuPont). However, it is often preferred to use an aqueous dispersion of pigment in binder. In this case, the most preferred pigments are in the form of binderless aqueous dispersions (i.e. Aquis II™ supplied by Heucotech) and the most preferred binders are those specifically designed for pigment wetting (i.e. Neocryl BT™ acrylic resins from Zeneca Resins). The use of appropriate binders promotes the formation of sharp, well defined lines during transfer. When the colorant transfer is induced by a high powered light source (i.e., xenon flash lamp), it is usually necessary to include as binder an energetic or gas producing polymer such as disclosed in U.S. Pat. Nos. 5,308,737 and 5,278,023.

The pigment/binder ratio is typically 1:1 but may range from 0.25:1 to 4:1. A Mayer bar may be used to coat the colorant layer. Typically, a #4 bar is used to coat the dispersion which contains approximately 10 wt. % solids to give a dry coating thickness of about 1 micron. Other combinations of dispersion % solids and Mayer bar number are used to achieve different coating thicknesses. In general, a dry coating thickness of 0.1 to 10 microns is desired.

Transfer assist layer refers to a layer of adhesive coated as the outermost layer of the donor or receptor. The adhesive serves to promote complete transfer of colorant during the separation of the donor from the receptor after imaging. Preferred are colorless, transparent materials with a slight tack or no tack at room temperature, such as Daratak™ adhesive emulsion from Hampshire Chemical Corporation.

A general description of color filters for liquid crystal displays is given in C. C. O Mara, Liquid Crystal Flat Panel Display: Manufacturing Science and Technology, Van Norstrand Reinhold, 1993 p. 70. Several fabrication methods are disclosed. The most common method for preparing color filters is using photolithographic techniques. One photolithographic process is detailed in an article entitled "Color Filters from Dyed Polyimides" W. J. Latham and D. W. Hawley, Solid State Technology, May 1988. This paper shows the complex, multi-step nature of the photolithographic process. By comparison, this invention provides a much simpler process for making a color filter array.

A preferred embodiment of this invention is when the windows formed by ablation or transparentization of the black coated substrate are in the form of simple geometric objects such as rectangles, squares or triangles. The color elements may also be simple geometric objects, however, it is important that the color elements completely cover the window element. Alternatively, for some configurations of color filters, the color elements may be created as stripes. Another common configuration for a color filter array is when the color elements in one row are displaced by one element in the second row and by two elements in the third row such that the color elements are diagonally aligned.

The dimensions of the elements can range from 5–1000 microns. More typically the dimensions are on the order of 50–300 microns. These dimensions are easily produced by photolithographic and laser imaging techniques.

The colors used to form the color filter are generally the primary additive colors, i.e. red, green, and blue. Each of these primary colors preferably has high color purity and transmittance, and, when combined, an appropriate white balance. The color filters preferably have spectral characteristics of red, green, and blue that show chromaticity close to the National Television Standards Committee (NTSC) standard colors indicated by the Commission International de l'Eclairage (CIE) chromaticity diagram. Although red, green, and blue are the most common colors for the filters, other color combinations may be used for specialty applications. In some cases, the repeat sequence in a row is red:green:blue. For other applications the repeat sequence in a row is red:green:green:blue.

The process of the present invention may be performed by fairly simple steps, which is one of the major advantages of the present invention. The final matrix substrate comprising the transmissive substrate and the black coating layer is image wise exposed to ablative levels of radiation to remove the black material in the desired shape of a matrix or distribution of windows. The same or different laser may be used to induce mass transfer of the colorant to the windows of the black matrix. However, when the matrix formation is performed on a laser imaging device and the color transfer is performed by the same laser imaging device, registration of the color images within the matrix is greatly simplified. As the data base for the matrix lines is already calibrated with the laser imaging system, the data base for the deposition of the color materials to form the color filter areas within the matrix can be identical to, or a precisely modified variation of the original ablative imaging data. The black material is removed from specific areas by the laser beam to form the matrix and the color material is being deposited within the same areas by the same lasers. The pattern of the laser for deposition of colors will (for the totality of colors laid down, if all windows within the matrix are to be filled) be approximately the same as the pattern for the ablation or transparentization used to form the matrix. It might be desirable in certain circumstances to have the laser imaging pattern within specific windows of the matrix extend into the matrix lines (i.e., exceed the limits of the imaging pattern used to form the matrix window) to assure complete filling of the window. Where a pair of adjacent matrix windows are to have different colors, the degree of extension of the color should be carefully controlled so that each color does not extend over a matrix line into a window intended to have a different color. This is easily effected within the limits of resolution of the laser imager. Where adjacent windows have the same color, the imaging process may allow deposition of the color within the adjacent windows and on top of the black lines defining the matrix, since the color deposition will not adversely affect the matrix lines.

During laser exposure it may be desirable to minimize formation of interference patterns due to multiple reflections from the imaged material. This can be accomplished by various methods. The most common method is to effectively roughen the surface of the donor material on the scale of the incident radiation as described in U.S. Pat. No. 5,089,372. This has the effect of disrupting the spatial coherence of the incident radiation, thus minimizing self interference. An alternate method is to employ the use of an antireflection coating on the second interface that the incident illumination encounters. The use of anti-reflection coatings is well known in the art, and may consist of quarter-wave thicknesses of a coating such as magnesium fluoride, as described in U.S. Pat No. 5,171,650. Due to cost and manufacturing constraints, the surface roughening approach is preferred in many applications.

A specific method of practicing this aspect of the present invention would be to retain the original data defining the window areas of a matrix formed on a black coated receptor sheet, assigning specific location values to each window. In providing colors within the windows, each window having an assigned location value can be provided with a predetermined color assigned to each location value. A modification of the assigned values (e.g., increase the image area for each color window by specified percentages of the matrix line widths, or an increase of specific dimensions in each direction [length and width]) can be programmed into the imaging data for the colors or be used to automatically or selectively modify the image values to change the location values for one or more colors, or even provide variations of colors in different areas of the windows, as where different color intensities might be desirable in different areas on the filter.

These and other aspects of the present invention can be seen in the following, non-limiting examples of the present invention.

EXAMPLES

Materials

A sample of a Toshiba DTI LCD filter was examined under a microscope in order to determine the approximate dimensions of the black matrix and color filter elements. A data file was generated to create images with these dimensions. A source of color donor sheets was obtained from GTI, Laser Proof™ (Product Code 3257).

Black aluminum ($AlO_x$) coated polyester (4 mil) was prepared using an e-beam evaporation technique as described above with respect to U.S. Pat. No. 4,364,995. This type of black aluminum material may be formed with gradation in the black layer so that each surface of the layer may be a slightly different composition. The degree of variation in composition may be such that one surface is shiny metal and the other surface may be completely metal oxide. Any variation therebetween may be accomplished by controlling the degree of oxygenation (or oxidation) of the metal during deposition. It is preferred that the directing of radiation against the black coating be performed with the radiation directed against a surface which is black (as opposed to shiny) for best use of the exposing energy.

The Black Matrix Precursor/Pigment Receiving Element

Daratac 90L adhesive (Hampshire Chemical Corporation) was diluted with distilled water to a 10% solid solution and coated with a #4 wire-wrapped rod onto either a) the non-aluminized side or b) the aluminized side of the black aluminum coated polyester and dried in an oven at 60° C. for 2 minutes.

Preparation of 5% Solution of Energetic Polymer—5% Poly BAMO/10AD

PolyBAMO{poly[bis(azidomethyl)oxetane]}, molecular weight of 4500 daltons as determined by gel permeation chromatography, was obtained from Aerojet Corp. A suspension of 90 g of BAMO in 300 g of methylethylketone (MEK) was warmed to about 60° C., at which point a homogeneous solution resulted. To the this solution was added 10 g of acetylene dicarboxylic acid. The mixture was heated for 3 hrs at 60° C. and then cooled to room temperature. Analysis by $^{13}C$ NMR indicated triazole formation. The MEK was evaporated to yield a viscous liquid which was then redissolved in a mixture at 50° C. of 2.4 g ethanolamine, 66 g isopropanol, and 160 g water. The mixture was analyzed to determine the percent solids whereupon it was further diluted with 350 g of water to result in a solution containing 5% solids.

Preparation of Pigment Stock Solutions

Blue dispersion A preparation: a pint jar, was charged with 66 g deionized water, 26.4 g isopropanol, and 39.6 g Microlith blue 4G-WA (Ciba-Geigy). This mixture was agitated on a high speed shear mixer for 2 minutes at slow speed, then 8.8 g of triethanolamine was added and the speed was increased to ½ speed for 20 minutes. To this mixture was added 22 g of deionized water and 8.8 g of isopropanol and stirring was continued for an additional 5 minutes.

The above procedure was repeated to give the dispersions with the following pigments used in place of Microlith blue 4G-WA: yellow dispersion A, Microlith yellow 2R-WA; yellow dispersion B, Microlith yellow 3G-WA; black dispersion A, Microlith black C-WA; violet dispersion A, Microlith violet RL-WA; red dispersion A, Microlith red RBS-WA.

Preparation of Binderless Pigment Stock Solutions

Binderless aqueous red, green, and blue pigment dispersions were obtained under the trade name Aquis II from Heucotech, Ltd. (QA magenta RW-3116, phthalo green GW-3450, and phthalo blue G/BW-3570, respectively). The dispersions were diluted to 10 wt % solids with distilled water and were agitated on a shaker table for ten minutes to obtain stock solutions.

Preparation of Energetic Polymer Stock Solution

A stock solution was prepared containing the ingredients: 0.9 g deionized water, 0.15 g 5% Fluorad™ FC 170Cin 1:1 (propanol:water), 13 g of 5% BAMO/10AD, 2.0 g Hycar 26106 dispersion (B. F. Goodrich).

Preparation of Vancryl Stock Solution

A stock solution was prepared containing the ingredients: 14 g water, 0.15 g 5% Fluorad™ FC 170Cin 1:1 (propanol:water), 2.0 g Vancryl 600 (an aqueous latex vinyl chloride-ethylene adhesive from Air Products).

Preparation of Neocryl Stock Solution

Neocryl BT-24 (45 wt % solids, emulsion in water, Zeneca Resins) was diluted to 20 wt % solids with distilled water and then was neutralized with aqueous ammonia to pH 8.0.

Preparation of Surfactant Solution

3M FC-170C surfactant was diluted to 5 wt % solids with water/isopropanol 1:1.

Preparation of Pigment/Energetic Polymer Coating Solutions

The pigment/energetic polymer coating solutions were prepared according to the following formulations:

Blue coating solution: The energetic polymer stock solution (3 g), 0.55 g of blue dispersion A, 0.55 g of yellow dispersion A, 1 g of water, and 5 drops of a 10% aqueous ammonium nitrate solution.

Green coating solution: The energetic polymer stock solution (3 g), 0.31 g of violet dispersion A, 0.8 g of blue dispersion A, and 4 drops of a 10% aqueous ammonium nitrate solution.

Red coating solution: The energetic polymer stock solution (3 g), 0.83 g of red dispersion A, 0.27 g of yellow dispersion A, and 4 drops of a 10% aqueous ammonium nitrate solution.

Black coating solution: The energetic polymer stock solution (4 g), 1.1 g of black dispersion A, and 4 drops of a 10% aqueous ammonium nitrate solution.

Cyan coating solution: The energetic polymer stock solution (4 g), 1.1 g of blue dispersion A, and 4 drops of a 10% aqueous ammonium nitrate solution.

Magenta coating solution: The energetic polymer stock solution (4 g), 0.83 g of red dispersion A, and 4 drops of a 10% aqueous ammonium nitrate solution.

Yellow coating solution: The energetic polymer stock solution (4 g), 0.55 g of yellow dispersion A, 0.55 g of yellow dispersion B, and 4 drops of a 10% aqueous ammonium nitrate solution.

Preparation of Pigment/Vancryl Coating Solutions

The pigment/Vancryl coating solutions were prepared according to the following formulations:

Blue coating solution: The Vancryl stock solution (3 g), 300 mg of violet dispersion A, 800 mg of blue dispersion A, and 1 g of water.

Green coating solution: The Vancryl stock solution (3 g), 550 mg of blue dispersion A, and 550 mg of yellow dispersion A.

Red coating solution: The Vancryl stock solution (3 g), 550 mg of yellow dispersion B, and 800 mg of red dispersion A.

Black coating solution: The Vancryl stock solution (3 g), 1 g of black dispersion A, and 1 g of water.

Preparation of Pigment/Neocryl Coating Solutions

Each of the coating solutions was prepared by mixing the listed ingredients, followed by agitation on a shaker table for ten minutes:

Red coating solution: The Neocryl stock solution (0.5 g), 1 g of binderless red pigment stock solution, 220 mg surfactant solution, and 2.5 g of water.

Green coating solution: The Neocryl stock solution (0.75 g), 2 g of binderless green pigment stock solution, 220 mg surfactant solution, and 1.25 g of water.

Blue coating solution: The Neocryl stock solution (0.5 g), 1 g of binderless blue pigment stock solution, 220 mg surfactant solution, and 2.5 g of water.

Preparation of Color Donor Elements (or Sheets)

The above coating solutions were coated on top of the black aluminum layer (TOD=1.0) of a black aluminum coated polyester. Coating solutions containing energetic polymer were coated with a #5 wire-wound Mayer bar except for the blue coating solution which was coated with a #4 wire-wound Mayer bar. All of the Vancryl and Neocryl based coating solutions were coated with a #4 wire-wound Mayer bar. The coating's were dried at 60° C. for 2 minutes.

Best results were achieved when an antireflection layer was coated onto the non-aluminized side of the polyester coating. This coating diminished an optical interference effect leading to an irregular "wood-grain" pattern. Suitable antireflection layers (described as roughening coatings of silica in U.S. Pat. No. 5,089,372, example 1) were coated onto the non-aluminized side of the polyester substrate.

Daratak/PET Receptor Preparation

Daratak 90L (Hampshire Chemical Company) was diluted to 10 wt % solids by the slow addition of distilled water. Large particles were removed by centrifugation (30 sec at 10,000 rpm). The solution was coated onto plain 4 mil PET using a #4 Mayer Rod and then dried for 2 min at 60° C.

INSTRUMENTAL

Two types of laser scanners were used, namely an internal drum type scanner, useful for imaging flexible substrates and a flat field system suitable for both flexible and rigid substrates.

Internal Drum System

Imaging was performed using a Nd:YAG laser, operating at 1.06 microns in $TEM_{00}$ mode and focused to a 26 micron spot ($1/e^2$) with 3.4 W of incident radiation at the image plane. The laser scan rate was 128 m/s. Image data was transferred from a mass-memory system and supplied to an acousto-optic modulator which performed the image-wise modulation of the laser. The image plane consisted of a 135° wrap drum which was translated synchronously perpendicular to the laser scan direction.

The substrate was firmly attached to the drum during the imaging of the window elements and the color filter elements. The required resolution of the final black matrix/color filter element was obtained via accurate placement of the scanned laser spots. The donor and the receptor were translated in a direction perpendicular to the laser scan at a constant velocity, using a precision translation stage.

Flat Field System

A flat-field galvonometric scanner was used to scan a focussed laser beam from a Nd:YAG laser (1064 nm) across an image plane. A vacuum stage was located at the image plane and was mounted in a motorized stage so that the material could be translated in the cross-scan direction. The laser power on the film plane was 3 W and the spot size was ~100 microns ($1/e^2$ width). The linear scan speed for the examples cited here was 600 cm/s. Polished glass (Corning #7059F) was mounted on the vacuum stage and was used as the receiving substrate. A donor sheet was placed in vacuum contact with the glass and was imaged with the laser. In the imaged areas, colored stripes of equivalent dimensions (~100 microns) were transferred to the glass.

Examples 1–3 demonstrate the formation of an integral black matrix/color filter array.

Example 1

The black matrix precursor/color receiving sheet (a-construction) was placed in a curved focal plane surface (internal drum) with the black aluminum layer side contacting the drum. This film was imaged to create a series of windows resulting in a black matrix/color receiving element. Without moving the receiving element relative to the drum, an energetic polymer/color donor sheet, described above, was then placed over the black matrix/color receiving sheet such that the color receiving sheet and the color donor sheet were in intimate contact. This contact was promoted by application of a vacuum. The construction was imaged and then the color donor sheet was peeled from the black matrix/color receiving sheet in the direction of the laser scan without moving the receiving sheet relative to the drum. This procedure was then repeated for the other colors to form a black matrix/color filter element. The best results were obtained by rubbing WD-40 (WD-40 Company), a penetrating lubricant, on the black aluminum side of the filter to remove any residual metal from the laser-exposed window elements. This debris removal method is disclosed in copending U.S. patent application Ser. No. 08/217,358.

Example 2

A film of black aluminum coated polyester without an adhesive layer, was placed in a curved focal plane surface (internal drum) with the black aluminum layer side away from the drum. This film was imaged to create a series of windows resulting in a black matrix/color receiving element. An energetic polymer/color donor sheet, described above, was then placed over the black matrix/ color receiving sheet such that the color receiving sheet and the color donor sheet were in intimate contact. This contact was promoted by application of a vacuum. The construction was imaged and then the color donor sheet was peeled from the black matrix/color receiving sheet in the direction of the laser scan. This procedure was then repeated for the other colors to form a black matrix/color filter element.

Example 3

A film of black aluminum coated polyester without an adhesive layer, was placed in a curved focal plane surface (internal drum) with the black aluminum layer side away from the drum. This film was imaged to create a series of windows resulting in a black matrix/color receiving element. A GTI color donor sheet, was then placed over the black matrix/color receiving sheet such that the color receiving sheet and the color donor sheet were in intimate contact. This contact was promoted by application of a vacuum. The construction was imaged and then the color donor sheet was peeled from the black matrix/color receiving sheet in the direction of the laser scan. This procedure was then repeated for the other colors to form a black matrix/color filter element. The GTI color donor sheet was believed to differ in two key respects from the energetic polymer color donor elements of the previous examples. The GTI color layer appeared to have a thin metallic aluminum layer, instead of a black aluminum layer, and 2) the GTI colorant layer was believed to contain an infrared absorbing dye.

Examples 4–6 demonstrate the formation of color filter elements without a black matrix. In these cases, the receiving substrate was not black aluminum coated polyester, but a polyester with an adhesive coating (Daratak 90L). In a similar manner, a black matrix could be used as the receiving element. Example 6 demonstrates the transfer of colorant without energetic polymer binders.

Example 4

Same as Example 3, except that GTI donor sheets were used with a Daratak 90L coated polyester color receiving sheet instead of a black matrix/color receiving sheet to form a color filter element.

Example 5

Same as Example 4, except that the energetic polymer/ color donor sheets were used in place of the GTI donor sheets to form a color filter element.

Example 6

Same as Example 4 except that the Vancryl/color donor sheets (red, green, and blue) were used in place of the GTI donor sheets to form a color filter element.

Examples 7–13 demonstrate the use of glass as the receiving substrate. These experiments were done using the flat field laser system. Although these examples demonstrate the formation of color filter elements without a black matrix, in a similar manner a black matrix could be used as the receiving element. An important aspect of these examples is the direct transfer to the glass substrate without the need for a receiving layer such as the Daratak.

Example 7

The GTI color donors (yellow, cyan) were sequentially transferred to glass to form colored stripes, and then the GTI color donor (black) was transferred to form the black matrix, resulting in a black matrix/color filter element.

Example 8

The GTI color donor (black) was transferred to glass to form a black matrix. Energetic polymer donor sheets (cyan and yellow) were then sequentially transferred on the black matrix to form a black matrix/color filter element.

Example 9

An energetic polymer/black donor sheet was transferred to glass to form a black matrix. Energetic polymer donor sheets (red, green, and blue) were sequentially transferred as stripes to the black matrix to form a black matrix/color filter element.

Examples 10–13 are examples of colorant transfer without energetic polymer binders. These experiments were done using the flat field laser system.

Example 10

The Vancryl/color donor sheet (red) was transferred directly to glass to form colored stripes.

Example 11

The Vancryl/color donor sheet (green) was transferred directly to glass to form colored stripes.

Example 12

The Vancryl/color donor sheet (black) was transferred directly to glass to form colored stripes.

Example 13

The Vancryl/color donor sheet (blue) was transferred directly to glass to form colored stripes.

Example 14

The Neocryl/color donor sheets (red, green, and blue) were sequentially transferred to a Daratak/PET receptor sheet using the internal drum laser system to form approximately 100×300 micron color patches of a color filter element.

Example 15

The black matrix precursor/color receiving sheet (b-construction) was placed in a curved focal plane surface (internal drum) with the Daratak/black aluminum side away from the drum. This film was imaged to create a series of windows by transparentizing the black aluminum while leaving the Daratak layer intact, resulting in a black matrix/color receiving element. Without moving the receiving element relative to the drum, a Neocryl color donor sheet (red) was placed over the black matrix/color receiving sheet such that the color receiving sheet and the color donor sheet were in intimate contact. This contact was promoted by application of a vacuum. The construction was imaged and then the color donor sheet was peeled from the black matrix/color receiving sheet in the direction of the laser scan without moving the receiving sheet relative to the drum. This procedure was then repeated for the other colors (green and blue) to form a black matrix/color filter element.

Example 16

Solvent based coating solutions were prepared according to the formulations listed in Table 1. A 10 wt % solution of dye was prepared by dissolving 4-tricyanovinyl-N,N-dibutylaniline (prepared by procedures analogous to those detailed in McKusick, et al., J. Amer. Chem. Soc., 80, 1958, 2806-15) in MEK. A 10 wt % solution of binder was prepared by dissolving PMMA (75,000 MW polymethylmethacrylate available from Polysciences) in MEK. The solutions were coated onto the black aluminum substrate (TOD=0.9) using a #5 Mayer bar. The coatings were dried for 5 min at 55° C. and then imaged. The magenta dye crystallized in the coated film at a dye/binder ratio of 1 or greater (40D-H) as was evidenced by a decrease in transparency and observable birefringence (using cross polarizers in an optical microscope). The crystalline magenta dye had a much redder hue than the dispersed dye.

TABLE 1

| Sample | Dye Solution | Binder Solution | Dye/Binder Ratio |
|---|---|---|---|
| 40A | 100 | 1000 | 0.1 |
| 40B | 500 | 1000 | 0.5 |
| 40C | 400 | 800 | 0.5 |
| 40D | 500 | 500 | 1 |
| 40E | 1000 | 500 | 2 |
| 40F | 1000 | 200 | 5 |
| 40G | 1000 | 100 | 10 |
| 40H | 1000 | 0 | — |

For this example, imaging was performed on a flat field Nd:YAG ($TEM_{00}$ mode) imaging device using a linear galvanometer. The parameters were 85 micron spot size, 7.2 W on the film plane, 6 m/sec linear scan speed). The receptor was an uncoated glass microscope slide.

The state of the dye on the corresponding imaged glass receptor was the same as that of the donor. Coatings with dye/binder ratios less than 1 were imaged to produce uniform films with dissolved dye. Those with ratios greater than or equal to 1 produced films with crystalline dye. The adhesion of all colorants to the glass surface was good to excellent—even those without binder.

All of the transferred samples appeared to be "overheated" in that the binders had a bubbled, thermally shocked look. In some cases such as 40A, a small portion of the dye appeared to be heated beyond the melting point, flowed, and recrystallized outside of the binder boundary. This indicated a post image heating and a scan speed that was lower than optimum and was likely an effect that was independent of the LITI transfer process.

Example 17

Aqueous coating solutions were prepared according to the formulations listed in Table 2. A 10 wt % solution of dye was prepared by dissolving copper(II) phthalocyanine tetrasulfonic acid tetrasodium salt (Kodak) in water. A 10 wt % solution of binder was prepared by dissolving Neocryl BT-8™ (Zeneca Resins) in water, followed by neutralization with aqueous ammonia to pH 8. The solutions were coated onto the black aluminum substrate (TOD=0.9) using a #5 Mayer bar. The coatings were dried for 5 min at 55° C. and then imaged. The dye crystallized in the coated film at a dye/binder ratio of 1 or greater (40N-S) as was evidenced by a decrease in transparency and observable birefringence (using cross polarizers in an optical microscope).

TABLE 2

| Sample | Dye Solution | Binder Solution | Dye/Binder Ratio |
|---|---|---|---|
| 40J | 100 | 1000 | 0.1 |
| 40K | 200 | 1000 | 0.2 |
| 40M | 400 | 800 | 0.5 |
| 40N | 500 | 500 | 1 |
| 40P | 1000 | 500 | 2 |
| 40Q | 1000 | 200 | 5 |
| 40R | 1000 | 100 | 10 |
| 40S | 1000 | 0 | — |

Imaging was performed as described in Example 16. The state of the dye on the corresponding imaged glass receptor was the same as that of the donor. Coatings with dye/binder ratios less than 1 were imaged to produce uniform films with dissolved dye. Those with ratios greater than or equal to 1 produced films with crystalline dye. The adhesion of all colorants to the glass surface was good to excellent. This example demonstrates the efficient transfer of an ionic dye in an ionic binder in the formation of color filter elements.

Example 18

A sacrificial layer was prepared as follows. A 10 wt % mixture in water of the ingredients listed in Table 3 was prepared at ~70° C.

TABLE 3

| Ingredient (Supplier) | Parts by Weight |
|---|---|
| Chlorowax 70 (Diamond Shamrock, Cleveland, OH) | 1.25 |
| Shellwax 700 (Shell Chemical Co., Houston, TX) | 1.67 |
| Acryloid B82 (Rohm & Haas, Philadelphia, PA) | 0.10 |
| Carnauba wax (Frank B. Ross Co., Jersey City, NJ) | 2.50 |
| Synthetic Candelilla (Frank B. Ross Co., Jersey City, NJ) | 1.00 |
| Staybelite Ester 10 (Hercules Inc., Wilmington, DE) | 0.05 |
| Elvax 210 (E. I. DuPont, Wilmington, DE) | 0.60 |

A small amount (2–5% to the solid content of the solution) of charging agent, OLOA 1200 (Chevron Chemical Co,., Rolling Meadows, Ill.), was added to the mixture. The solution was then brought back to room temperature under high speed agitation and a stable emulsion was obtained.

The emulsion was coated on 6 micron PET using a #10 Mayer bar and dried in an oven at 80° C. for 1 minute to form a non-ir absorbing thermoplastic coating. The film was then laminated to black aluminum at 230° F. A reflective mask was placed in contact with the substrate and imaged as described earlier. After laser exposure and removal of the mask, the 6 micron PET with the thermoplastic coating was peeled away from the black aluminum film. An exact replica of the original image was obtained and no debris was observable on the surface.

Example 19

Solvent based pigment millbases were prepared according to the formulations (in grams) listed in Table 4:

TABLE 4

|  | GS Yel | RS Mag | BS Mag | GS Cyan | RS Cyan |
|---|---|---|---|---|---|
| Pigment | 47.17 | 47.17 | 47.17 | 47.17 | 47.17 |
| Joncryl | 35.38 | 47.17 | 35.38 | 47.17 | 47.17 |
| Butvar | 11.79 | — | 11.79 | — | — |
| Dis. 161 | 5.66 | 5.66 | 5.66 | 5.66 | 5.66 |

The pigments used in the GS Yel, RS Mag, BS Mag, GS Cyan, and RS Cyan millbases were Hoechst Celanese GG-1100, Sun 234-0077, Hoechst Celanese 13-7019, Sun 249-0592 and Sun 248-0165, respectively. Joncryl was Joncryl 690 by Johnson Wax; Butvar was Butvar B-98 by Monsanto; and Dis. 161 was Disperbyk 161 by Byk Chemie. All were 25% solids in MEK/1-methoxy-2-propanol 1:3.

The blue, green, and red color donor coatings were formulated from the above millbases as follows:

Blue: 1.6 g RS Cyan, 0.4 g BS Magenta, 0.75 g MEK;

Green: 0.4 g GS Cyan, 0.7 g GS Yellow, 0.5 g MEK;

Red: 1.7 g RS Magenta, 0.3 g GS Yellow, 1.0 g MEK.

The above ingredients were combined and were placed on a shaker table for 10 minutes. The formulations were coated onto black aluminum with a #4 Mayer Rod and were dried for 2 minutes at 60° C.

A receptor coating solution was prepared by adding 9.0 g water slowly with stirring to 2.0 g Daratak 90L (W. R. Grace Co.) and stirring for ten minutes. The solution was coated onto clear PET and was dried as described above to give a receptor sheet.

The blue, green, and red color donors were imaged against the receptor sheet on the internal drum system with the laser scanning at a velocity of 64 m/sec to give patches of colors to form a color filter matrix.

What is claimed is:

1. A method for forming a black matrix and color filter on a substrate comprising the steps of:

providing a black coating layer on a surface of the substrate;

transparentizing one or more areas of the black coating layer in an imagewise fashion by selectively irradiating the black coating layer on the substrate; and depositing color material on the substrate on at least a portion of the one or more areas where the black coating has been transparentized.

2. The method of claim 1, wherein selectively irradiating the black coating is performed using a high energy light source.

3. The method of claim 2, wherein the high energy light source comprises a laser.

4. The method of claim 1, wherein the step of transparentizing comprises removing portions of the black coating.

5. The method of claim 1, wherein the black coating comprises a black body absorber.

6. The method of claim 1, wherein the black coating layer comprises a metal, a metal oxide, or a metal sulfide.

7. The method of claim 1, wherein the color material is deposited on the substrate by thermal transfer of color material from a donor sheet.

8. The method of claim 1, wherein the color material is deposited on the substrate by laser induced thermal transfer of color material from a donor sheet.

9. The method of claim 8, wherein the donor sheet contacts the substrate during transfer of the color material.

10. The method of claim 8, wherein the donor sheet comprises a base layer, a transfer layer comprising a colorant in a binder, and a light-to-heat conversion layer disposed between the base layer and the transfer layer.

11. The method of claim 1, wherein at least two different colors are deposited on different portions of the one or more areas where the black coating layer has been transparentized.

12. The method of claim 11, wherein the at least two different colors are deposited by laser induced transfer from one or more donor sheets.

13. The method of claim 1, wherein at least three different colors are deposited on different portions of the one or more areas where the black coating layer has been transparentized.

14. The method of claim 13, wherein the at least three different colors are deposited by laser induced transfer from one or more donor sheets.

15. The method of claim 1, wherein the color material comprises a dye.

16. The method of claim 1, wherein the color material comprises a pigment disposed in a binder.

* * * * *